United States Patent [19]

Dickinson et al.

[11] 4,047,012

[45] Sept. 6, 1977

[54] GENERAL PURPOSE CALCULATOR HAVING FACTORIAL CAPABILITY

[75] Inventors: Peter D. Dickinson, Monte Sereno; Thomas E. Osborne, San Francisco; France Rode; Allen J. Baum, both of Los Altos; David S. Cochran, Palo Alto; Chung C. Tung, Santa Clara, all of Calif.

[73] Assignee: Hewlett-Packard Company, Palo Alto, Calif.

[21] Appl. No.: 566,631

[22] Filed: Apr. 8, 1975

Related U.S. Application Data

[62] Division of Ser. No. 364,570, May 29, 1973, abandoned.

[51] Int. Cl.² ............................................. G06F 15/20
[52] U.S. Cl. ............................................. 235/156
[58] Field of Search ............... 235/156, 159, 160, 164; 340/172.5; 444/1

[56] References Cited

U.S. PATENT DOCUMENTS

| 3,760,171 | 9/1973 | Wang et al. | 235/156 |
| 3,863,060 | 1/1975 | Rode et al. | 235/156 |

*Primary Examiner*—David H. Malzahn
*Attorney, Agent, or Firm*—F. D. LaRiviere

[57] ABSTRACT

The battery powered hand-held calculator for performing the arithmetic, trigonometric and logarithmic functions disclosed herein includes a factorial function which conveniently calculates factorials of positive integers.

2 Claims, 3 Drawing Figures

GENERAL PURPOSE CALCULATOR HAVING FACTORIAL CAPABILITY

CROSS-REFERENCE TO RELATED APPLICATION

This application is a division of U.S. Pat. application Ser. No. 364,570 entitled "Improved Scientific Calculator" filed by Peter D. Dickinson, et al. on May 29, 1973, now abandoned in favor of continuation application Ser. No. 566,143 entitled "General Purpose Calculator Having Selective Data Storage, Data Conversion and Time-Keeping Capabilities" filed Apr. 8, 1975 by Peter D. Dickinson et al. Allowed U.S. Pat. application Ser. No. 566,144, now U.S. Pat. No. 4,001,569 also a division of abandoned U.S. Pat. application Ser. No. 364,570, is hereby incorporated by reference as amended as if fully set forth herein.

SUMMARY OF THE INVENTION

This invention relates generally to calculators and improvements therein and more particularly to nonprogrammable scientific calculators.

The preferred embodiment of the present invention eliminates the long series of separately initiated multiplications necessary in prior art calculators to determine the factorial of a number. The factorial of a positive number up to 69 may be calculated upon actuation of a single key on the keyboard.

DESCRIPTION OF THE DRAWINGS

FIGS. 3-36 inclusive may be found in the above incorporated allowed U.S. patent application.

DESCRIPTION OF THE PREFERRED EMBODIMENT

Figure 1:
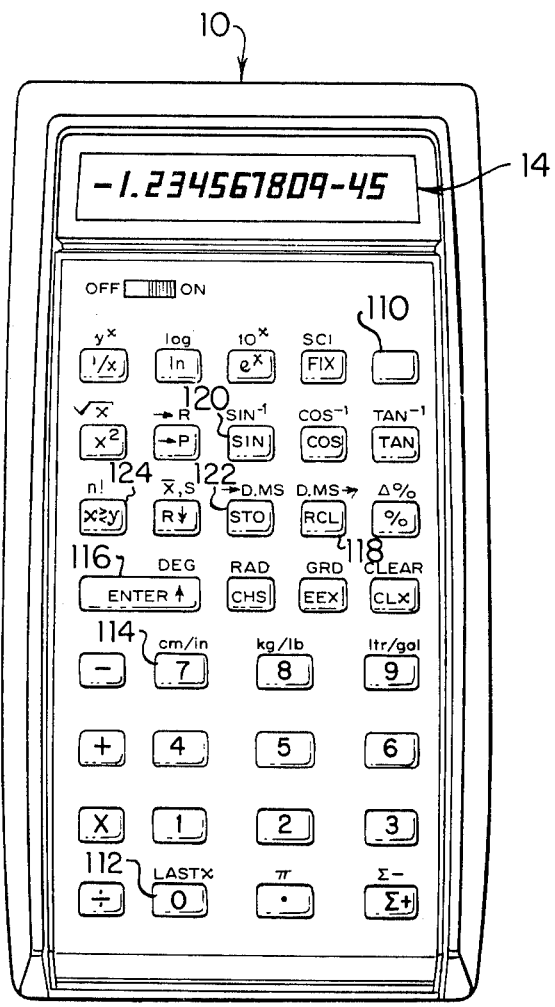
FIG. 1 is a top view of a general purpose calculator having selective data storage and data conversion capabilities according to the preferred embodiment of the invention.
Figure 2:
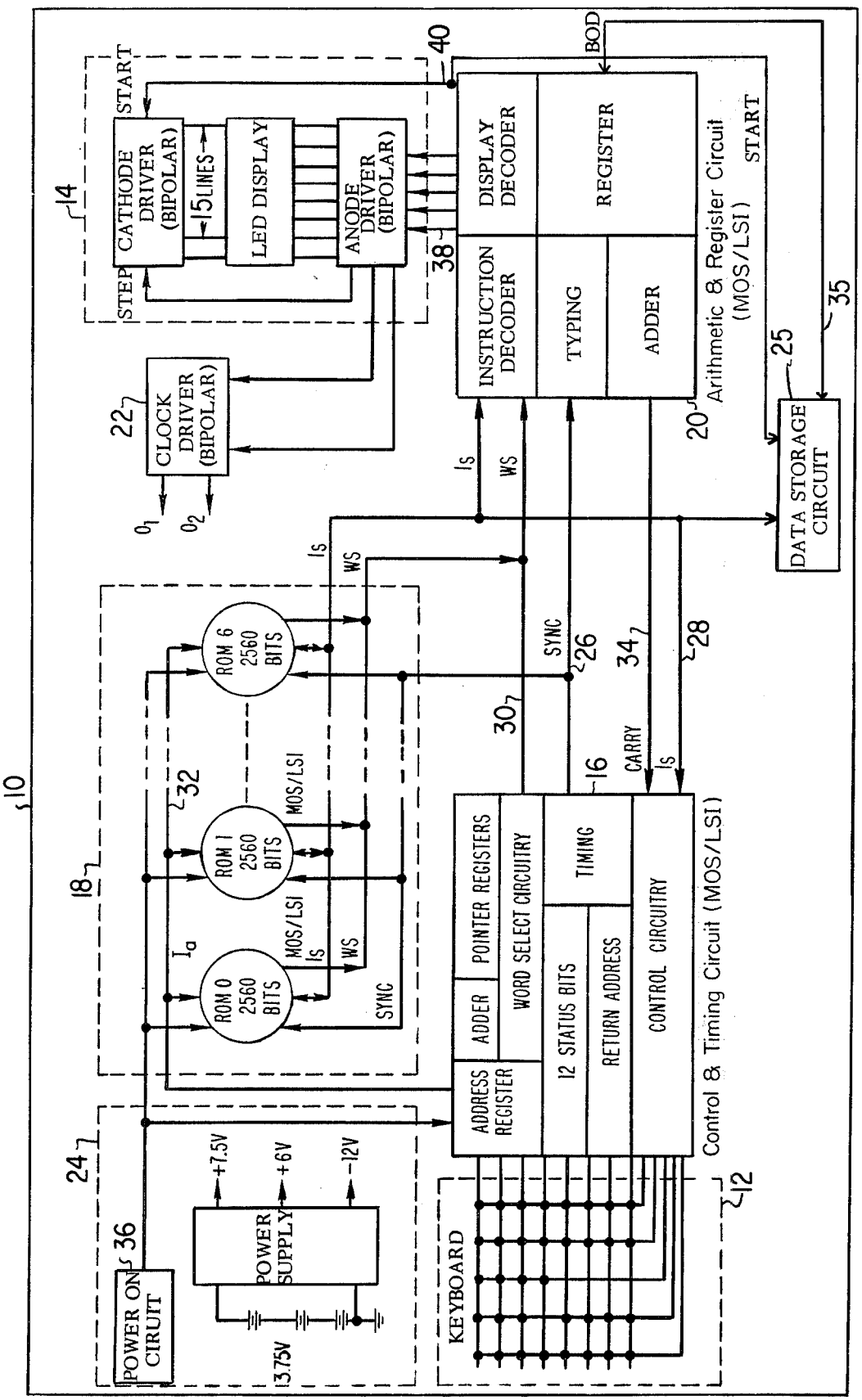
FIG. 2 is a block diagram of the calculator of FIG. 1.
Figure 37:
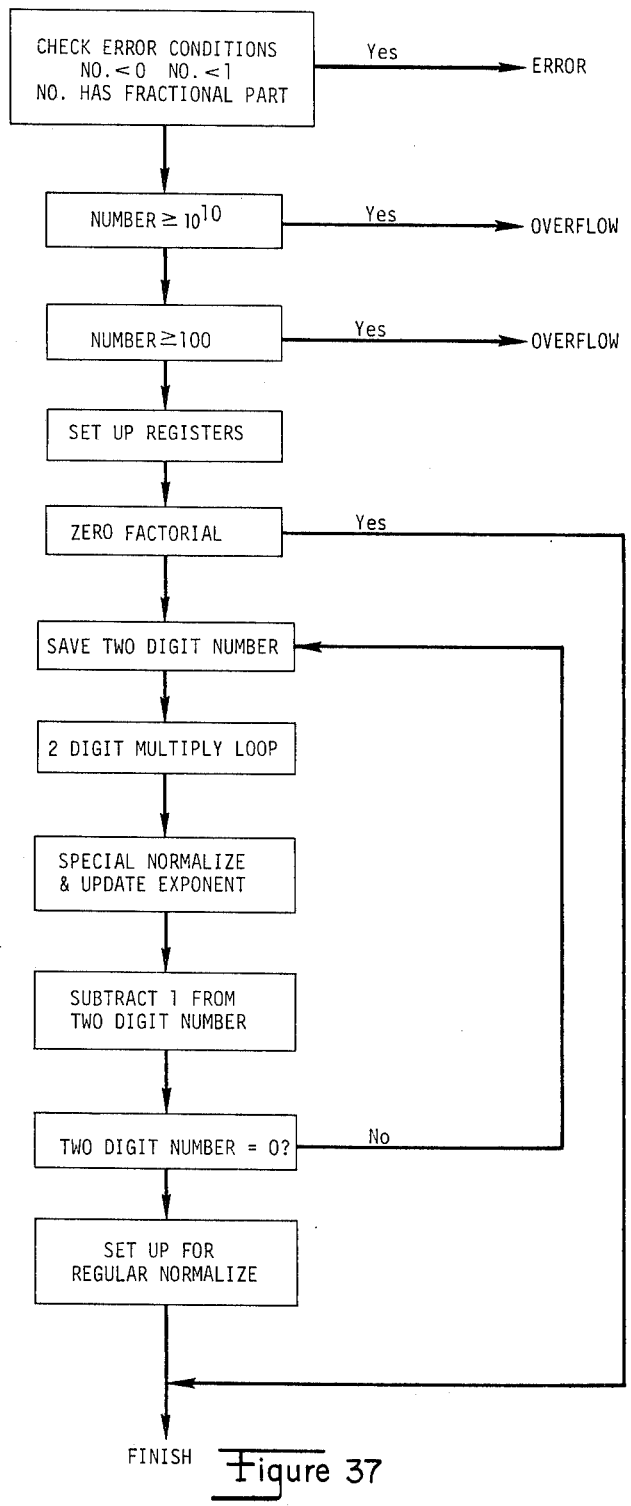
FIG. 37 is a flow diagram of the algorithm for calculating the factorial of a number in the calculator of FIGS. 1 and 2.

A calculator according to the preferred embodiment of the present invention also calculates factorials and easily solves combination and permutation problems. Factorials can be calculated for positive integers from zero to 69. For example, the factorial of the number 5 (i.e., 5!) can be calculated as shown in FIGS. 1, 2 and 37 by consecutively entering the number 5 into the calculator pressing the prefix key 110, and pressing the factorial (n!) key 124 to obtain and display the result 120. This feature is implemented by a subroutine given below on lines 188-201 and 203-243 of the listing for ROM 6. Refer to allowed U.S. Patent Application Ser. No. 566,144.

We claim:

1. An electronic calculator for calculating the factorial of a positive number entered into the calculator, said calculator comprising:

input means including a plurality of manually operable numeric and non-numeric keys for entering information into the calculator;

a first storage register for initially storing the entered number and for subsequently storing decremented values thereof; and a second storage register coupled to the first storage register having a first field including one's and ten's digit positions for storing a preselected constant number in the ten's digit position thereof, and a second field for storing a number;

a third storage register coupled to the first and second storage registers having a first field including one's and ten's digit positions for storing successively modified values of the entered number, and a second field for storing a number;

processing means responsive to the actuation of a non-numeric key of the output means and coupled to the first, second and third storge registers for repetitively decrementing the entered number unless that number is zero, and, following each such decrementing, transferring each decremented value of the entered number to the first field of the third register, for performing a first series of successive additions to the contents of the first and second fields on the second and third storage registers, respectively, the sums of the first series of successive additions being stored in the first and second fields, respectively, of the third register, until the ten's digit position of the first field of the third register equals a first value, thereupon left-shifting the numbers stored in the first and second fields of the third register so that the one's digits of those numbers occupy the ten's digit positions of those fields, for performing a second series of successive additions of the contents of the first and second fields of the second storage register to the left-shifted contents of the first and second fields of the third register, respectively, the sum of the second series of successive additions being stored in the first and second fields, respectively, of the third register, until the ten's position of the first field of the third register equals the first value, for repetitively storing the resultant number in the second field of the third storage register in the second field of the second register, and then zeroing the second field of the third register; and output means coupled to the processing means for providing an output indication of the total of the first and second series of successive additions of the contents of the second field of the second storage register and the second field of the third storage register, said total representing the factorial of the entered number.

2. An electronic calculator as in claim 1 wherein:

the preselected constant number is 1;

the processing means computes the negative of the entered number;

the repetitive modification by said processing means comprises the repetitive incrementing of the negative of the entered number;

the first value is nine; and the second value is zero.

* * * * *

UNITED STATES PATENT OFFICE
CERTIFICATE OF CORRECTION

Patent No. 4,047,012     Dated September 6, 1977

Inventor(s) Peter D. Dickinson et al.

It is certified that error appears in the above-identified patent and that said Letters Patent are hereby corrected as shown below:

Column 2, line 18, "output" should read -- input --.

Column 2, line 26, "on" should read -- of --.

Signed and Sealed this

Fourth Day of April 1978

[SEAL]

Attest:

RUTH C. MASON
Attesting Officer

LUTRELLE F. PARKER
Acting Commissioner of Patents and Trademarks